(12) United States Patent
Ross et al.

(10) Patent No.: US 6,597,809 B1
(45) Date of Patent: Jul. 22, 2003

(54) ROLLUP FUNCTIONS FOR EFFICIENT STORAGE PRESENTATION AND ANALYSIS OF DATA

(75) Inventors: David Justin Ross, Redmond, WA (US); Stephen E. M. Billester, Bothell, WA (US); Brent R. Smith, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 0 days.

(21) Appl. No.: 09/528,749

(22) Filed: Mar. 20, 2000

Related U.S. Application Data

(60) Provisional application No. 60/125,352, filed on Mar. 19, 1999, and provisional application No. 60/125,257, filed on Mar. 19, 1999.

(51) Int. Cl.[7] .............................. G06K 9/72; G06K 9/68; G06K 9/62; G06K 9/00; G10L 15/04; G06F 15/00

(52) U.S. Cl. ....................... 382/229; 382/226; 382/228; 382/187; 704/251; 715/534

(58) Field of Search ................................. 382/185, 186, 382/187, 188, 189, 226, 228, 229, 230; 715/530, 531, 532, 534; 704/251, 252

(56) References Cited

U.S. PATENT DOCUMENTS

| | | | |
|---|---|---|---|
| 4,718,102 A | * 1/1988 | Crane et al. | 382/185 |
| 5,329,609 A | * 7/1994 | Sanada et al. | 704/251 |
| 5,768,451 A | 6/1998 | Hisamitsu et al. | 382/309 |
| 5,774,588 A | * 6/1998 | Li | 382/230 |
| 5,802,205 A | 9/1998 | Emico et al. | 382/187 |
| 5,805,911 A | * 9/1998 | Miller | 715/534 |
| 5,835,635 A | * 11/1998 | Nozaki et al. | 382/226 |
| 5,963,666 A | 10/1999 | Fujisaki et al. | 382/187 |

FOREIGN PATENT DOCUMENTS

EP 0595064 10/1993 ......... G06F/15/401

OTHER PUBLICATIONS

PCT International Search Report dated Jul. 17, 2000 for Application No. PCT/US00/07518.

Cavnar, W.B., "N–Gram–Based Matching for Multifield Database Access in Postal Applications," Apr. 26, 1993, pp. 287–297.

* cited by examiner

Primary Examiner—Mehrdad Dastouri
(74) Attorney, Agent, or Firm—Stoel Rives LLP

(57) ABSTRACT

Methods of organizing a series of sibling data entities in a digital computer are provided for preserving sibling ranking information associated with the sibling data entities and for attaching the sibling ranking information to a joint parent of the sibling data entities to facilitate on-demand generation of ranked parent candidates. A rollup function of the present invention builds a rollup matrix (126) that embodies information about the sibling entities and the sibling ranking information and provides a method for reading out the ranked parent candidates from the rollup matrix in order of their parent confidences (141). Parent confidences are based on the sibling ranking information, either alone or in combination with n-gram dictionary ranking or other ranking information.

16 Claims, 11 Drawing Sheets

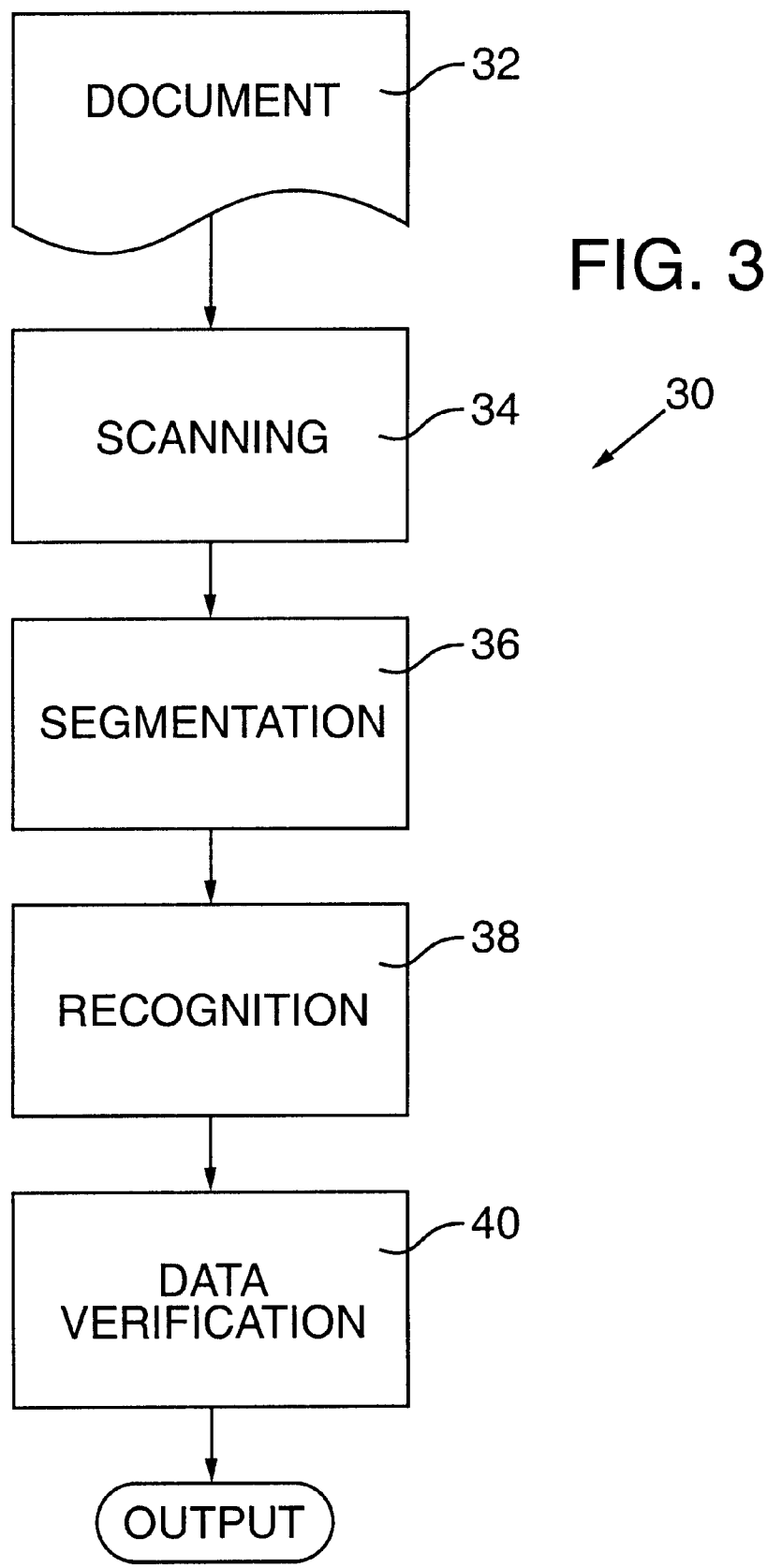

FIG. 6A

| | C1 | | C2 | | C3 | | C4 | |
|---|---|---|---|---|---|---|---|---|
| R5 | | | | | | | | |
| R4 | | | | | | | | |
| R3 | | | | | | | | |
| R2 | a,2 | | | | | | | |
| R1 | o,1 | | | | | | | |
| R0 | | | | | | | | |
| | 94 | 98 | 96 | | T0 | T1 | T0 | T1 |

FIG. 6B

| | C1 | | C2 | | C3 | | C4 | |
|---|---|---|---|---|---|---|---|---|
| R5 | | | | | | | | |
| R4 | | | | | | | | |
| R3 | | | n,1 | | | | | |
| R2 | a,2 | | u,0 | n,1 | | | | |
| R1 | o,1 | | u,0 | | | | | |
| R0 | | | | | | | | |
| | T0 | T1 | T0 | T1 | T0 | T1 | T0 | T1 |

FIG. 6C

| | C1 | | C2 | | C3 | | C4 | |
|---|---|---|---|---|---|---|---|---|
| R5 | | | | | | | | |
| R4 | | | | | t,1 | | | |
| R3 | | | n,1 | | t,1 | | | |
| R2 | a,2 | | u,0 | n,1 | t,1 | | | |
| R1 | o,1 | | u,0 | | | | | |
| R0 | | | | | | | | |

FIG. 6D

| | C1 | | C2 | | C3 | | C4 | |
|---|---|---|---|---|---|---|---|---|
| R5 | | | | | | | s,1 | |
| R4 | | | | | t,1 | | 5,0 | s,1 |
| R3 | | | n,1 | | t,1 | | 5,0 | s,1 |
| R2 | a,2 | | u,0 | n,1 | t,1 | | 5,0 | |
| R1 | o,1 | | u,0 | | | | | |
| R0 | | | | | | | | |

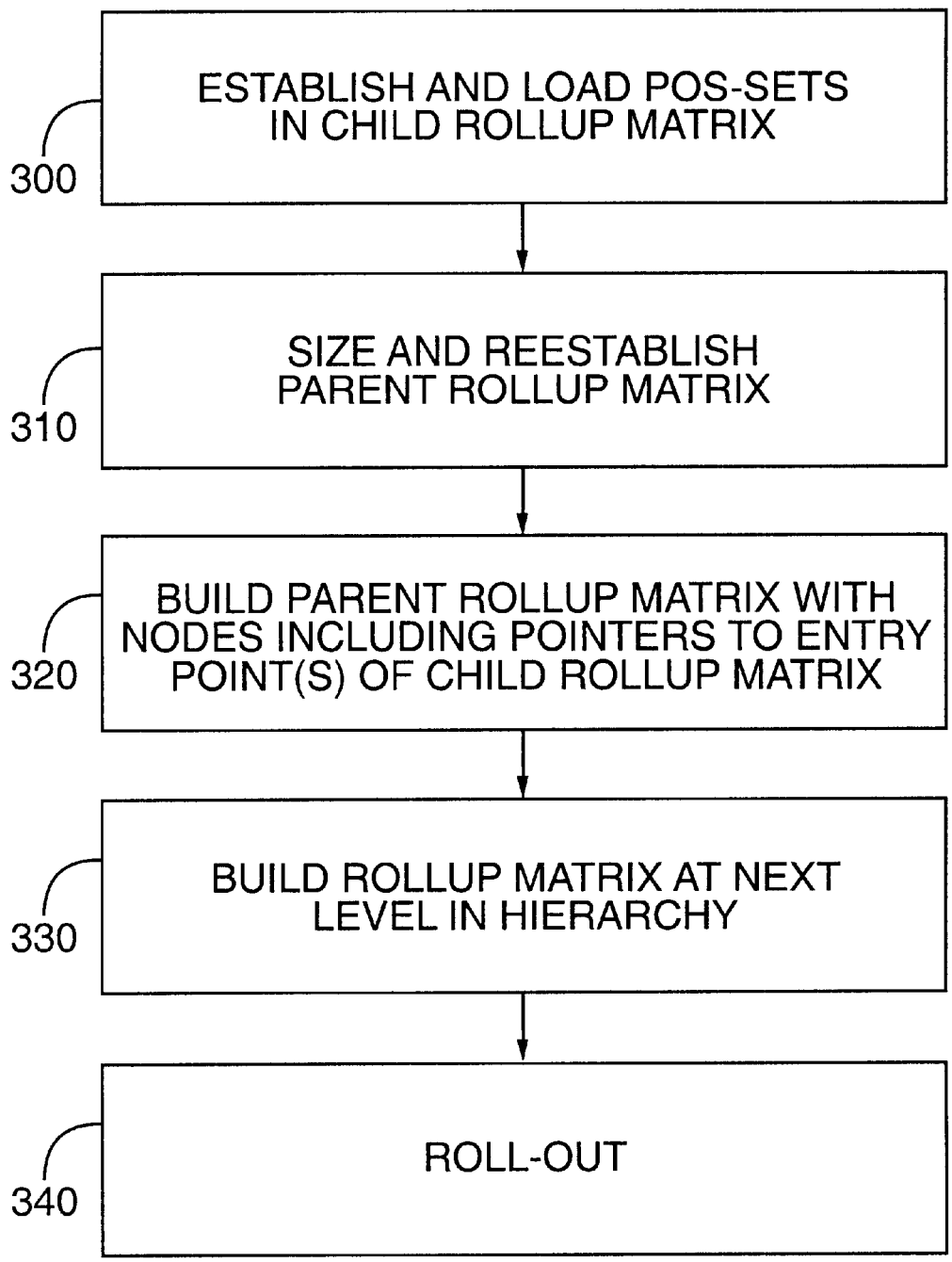

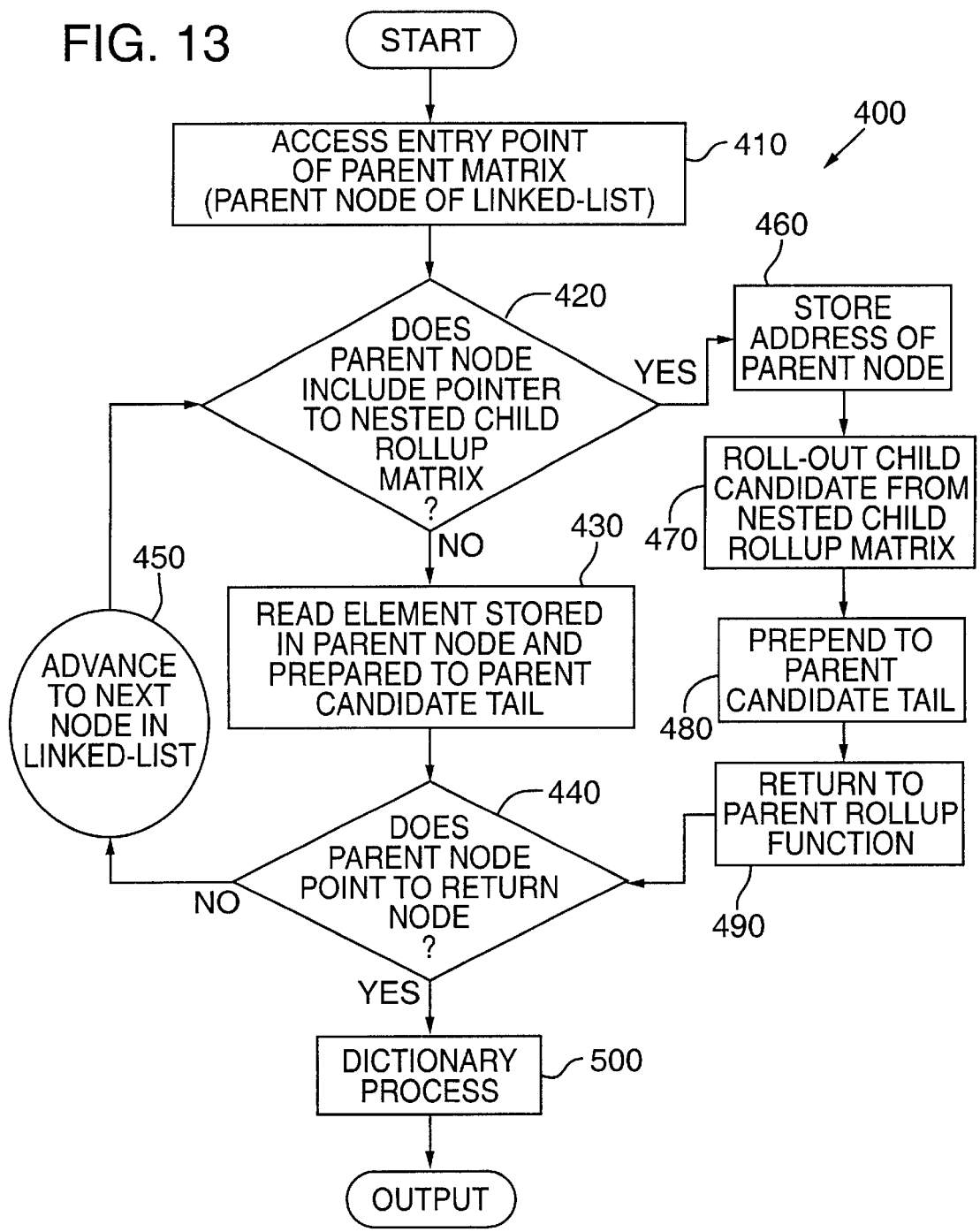

ROLLUP FUNCTIONS FOR EFFICIENT STORAGE PRESENTATION AND ANALYSIS OF DATA

RELATED APPLICATIONS

This application claims the benefit under 35 U.S.C. §119(e) of U.S. Provisional Patent Application Nos. 60/125,257 and 60/125,352, both filed Mar. 19, 1999.

TECHNICAL FIELD

The present invention relates to computer-implemented methods and data structures for producing candidate parent entities that are ranked in accordance with ranking information associated with given child entities and, in particular, to such methods for use with software parsers and data dictionaries, for example, of the kind utilized in a system for automated reading, validation, and interpretation of hand print, machine print, and electronic data streams.

BACKGROUND OF THE INVENTION

Optical character recognition (OCR) systems and digital image processing systems are known for use in automatic forms processing. These systems deal with three kinds of data: physical data, textual data, and logical data. Physical data may be pixels on a page or positional information related to those pixels. In general, physical data is not in a form to be effectively used by a computer for information processing. Physical data by itself has neither useable content nor meaning. Textual data is data in textual form. It may have a physical location associated with it. It occurs in, for example, ASCII strings. It has content but no meaning. We know what textual data says, but not what it means. Logical data has both content and meaning. It often has a name for what it is.

For example, there may be a region of black pixels in a certain location on an image. Both the value of the pixels and their location are physical data. It may be determined that those pixels, when properly passed through a recognizer, say: "(425) 867-0700" Content has been derived from the physical data to generate textual data. If we now know that text of this format (or possibly at this location on a pre-printed form) is a telephone number, the textual data becomes logical data.

To facilitate reconciliation of imperfections in physical data and shortcomings of the recognition process, each recognized element of textual data, e.g., a character, may be represented by a ranked group of unique candidates called a "possibility set." A possibility set includes one or more candidate information pairs, each including a "possibility" and an associated confidence. In the context of an OCR system, the confidence is typically assigned as part of the recognition process. For computational efficiency, the confidences may be assigned within an appropriate base-2 range, e.g., 0 to 255, or a more compact range, such as 0 to 7. For example, FIG. 1 shows an enlarged view of an individual glyph 20 that may be physically embodied as a handwritten character or as a digital pixel image of the handwritten character. From glyph 20, an optical character recognition process may generate the possibility set shown in TABLE 1 by assigning possibilities and associated confidences:

TABLE 1

| possibility | confidence |
|---|---|
| c | 200 |
| e | 123 |
| o | 100 |

FIG. 2 shows a series of sibling glyphs 22, which are known as "siblings" because they share the same parent word 24. The sibling glyphs 22 can be represented by the four possibility sets as shown in the following TABLE 2:

TABLE 2

| poss | conf | poss | conf | poss | conf | poss | conf |
|---|---|---|---|---|---|---|---|
| c | 200 | h | 190 | o | 100 | r | 125 |
| o | 150 | n | 100 | a | 80 | n | 100 |
| e | 100 | r | 80 | | | | |

The possibilities of these four possibility sets can be readily combined to form 36 unique strings: "chor", "ohor", "ehor", "cnor", "cror", etc. The number of unique strings is determined by the product of the number of character possibilities in each possibility set, i.e., 3×3×2×2=36.

To gage or verify their accuracy, the unique "candidate" strings may be processed by a "dictionary" of valid outcomes. In the context of OCR, a dictionary is a filter. It has content and rules. Each candidate string processed by the dictionary is subject to one of three possible outcomes: it is passed, it is rejected, or it is modified into a similar string that passes. One example of a dictionary is based on the English language. For parent word 24 of FIG. 2, the candidate strings "chor" and "ehar" would be rejected by such a dictionary, while "char" would be passed.

Because dictionaries often have a very large amount of content against which a candidate string is compared, it may be unduly time-consuming to apply the dictionary to all possible strings. To improve efficiency, it is desirable, before applying a dictionary, to rank the candidate strings in order of some confidence based on the accuracy of recognition. In this way the candidate strings having the highest confidence of having been accurately recognized are processed by the dictionary first. Rules can then be used to determine when to stop dictionary processing, e.g., when enough candidate strings have been processed to have isolated the best candidate strings (with a certain probability). A convenient way to rank candidate strings is to calculate string confidences based on the confidences of the component character possibilities that make up each candidate string. A set of candidate strings and their associated string confidences is referred to as an "alt-set."

One way to rank parent candidates for creating an alt-set is to add the child confidences for each parent candidate. In the above example, "chor" would have a ranking of 615 (the sum of the confidences associated with the individual characters c-h-o-r), "ohor" would have a ranking of 565, "ehor" would have a ranking of 515, etc. Combining the possibility sets to form the 36 unique strings and to calculate their rankings is simple in this example. However, there is no obvious way to read the strings out in ranked order. The strings must first be assigned a ranking, then ordered or sorted based on their assigned rank. This ordering or sorting step becomes especially problematic for longer strings formed from sibling possibility sets having a greater number of possibilities. By way of illustration, a hypothetical 10-character parent word in which each child possibility set includes 10 possibilities would result in 10 billion unique strings. It would be a very time-consuming and computationally expensive task to rank and order 10 billion 10-character strings.

Another known way of improving the efficiency of dictionaries is to use specialized dictionaries that contain smaller amounts of content than a more generalized dictionary but that are limited in their application. One such specialized dictionary is an "n-gram" dictionary, which includes information about the frequency in which certain character sequences (e.g., two-letter, three-letter, etc.) occur in the English language. For example, the two-letter combination "Qu" (a 2-gram) occurs in English words much more frequently than "Qo." To benefit from an n-gram dictionary, the confidence assigned to an n-gram is some combination of (1) the aggregate character confidences and (2) the n-gram frequency provided by the n-gram dictionary. Thus, recognition may have produced Oueen and Queen where the first character has the possibility set: poss=O, conf=200; poss=Q, conf=100, but in the English language "Qu" happens much more often than "Ou", so the 2-gram dictionary would help determine that Queen is the more likely parent string.

A need exists for a method of generating candidate strings in ranked order on an as-needed basis and, more generally, for a method of generating ranked parent candidates on an on-demand basis from a series of sibling possibilities. A need also exists for such a method that can be used with data at different logical levels in a logical data hierarchy, such as n-grams, words, and phrases.

SUMMARY OF THE INVENTION

In accordance with the present invention, methods of organizing a series of sibling data entities are provided for preserving sibling ranking information associated with the sibling data entities and for attaching the sibling ranking information to a joint parent of the sibling data entities to facilitate on-demand generation of ranked parent candidates. A rollup function of the present invention builds a rollup matrix containing information about the sibling entities and the sibling ranking information and provides a method for reading out the ranked parent candidates from the rollup matrix in order of their parent confidences, which are based on the sibling ranking information. Parent confidences may also be based, in part, on n-gram ranking or other ranking information.

External to the rollup function of the present invention, sibling entities are generated and passed to the rollup function for processing. Generation of a series of sibling entities may, in the context of OCR, involve optical scanning, recognition processing, and parsing. Each sibling entity comprises one or more ranked child possibilities, each having an associated child confidence. The number of child possibilities in a sibling entity is referred to as the "child population" of the sibling entity. Each sibling entity may include a range of child confidences, one of which is the maximum child confidence.

In one aspect of the invention the rollup function is implemented in computer software operable on a digital computer. The rollup matrix is modeled as a three-dimensional data array called a rollup table. The rollup table serves as a convenient visual aid to understanding the nature of the rollup matrix and operation of the rollup function. What is the matrix? It should be understood that nothing in the foregoing description of the rollup table should be construed as limiting the scope of the invention to implementation of the rollup matrix in data arrays. Other data structures, such as linked lists, are also suitable for implementing the rollup function of the present invention. It should be understood, therefore, that the term "rollup matrix" as used herein shall mean data tables, linked lists, and any other device for defining relationships between nodes in a data structure, where such nodes include one or more elements of data and one or more relationships to other nodes, procedures, or nested rollup functions. Furthermore, it will be apparent from the foregoing description of the invention that while the invention is suitable for use with OCR technology, it is also suitable for use with processing of other types of content-bearing data in which uncertainty in the data content is sought to be resolved. Non-OCR applications of the invention involving resolution of empirical uncertainty may include, for example, bioinformatics systems for analyzing gene sequencing information.

After receiving a series of sibling data entities, a matrix initialization routine of the rollup function establishes a rollup table and sizes it based on properties of the sibling entities. In particular, the rollup table is sized to include a series of "columns" equal in number to the number of sibling entities received. The dimension of the rollup table spanned by the columns is referred to as the "width" of the table. The rollup table is sized in a "height" dimension based on a number of "rows," with each having a row position indicating its position along the height dimension of the data table. The number of rows, and consequently the height of the table, is based on the sum of the maximum child confidences of the sibling entities. In practice, the number of rows may be established as equal to the sum of the maximum child confidences plus one. The rollup table is sized in a "depth" dimension based on the largest of the child populations of the sibling entities. The rollup table is a collection of "nodes," each located in the rollup table at a position defined by column, row position, and a depth position in the depth dimension.

Once the rollup function has established the rollup table, a loading routine of the rollup function then loads the sibling entities into the rollup table in a predetermined loading sequence beginning with loading a first sibling entity in a first column of the series of columns. Each sibling entity is loaded in sequence, from the first sibling entity to the last sibling entity in the series. If the sibling entities have no serial relationship, then an arbitrary, but ordered sequence of loading is chosen. Each child possibility of the first sibling entity is loaded into a node of the rollup table located at the first column and at the row having a row position corresponding to the child confidence of the child possibility being loaded. The rollup function then proceeds to load the second sibling entity in the series in a second column. For the second and each subsequent sibling entity and column, the rollup function loads each child possibility in one row of the current column for each row of the immediately preceding column having a filled node. The child possibilities of the second sibling entity are loaded in rows of the second column that have row positions offset from the row positions of filled nodes of the immediately preceding column (i.e., the first column) by an offset amount corresponding to the child confidence of the child possibility being loaded in the second column. The child possibilities of the third sibling entity are loaded in rows of the third column having row positions offset from the row positions of filled nodes of the second column by an offset amount corresponding to the child confidence of the child possibility being loaded in the third column, and so on, until the last sibling entity has been loaded in the last column of the rollup table. Each entry in the last column of the rollup table is a terminal element. Due to different confidence values that may be associated with multiple child possibilities of each of the sibling entities, the loading sequence may result in the loading of multiple elements in a particular column and row position. During loading, if a node has already been filled with a child possibility, the loading routine offsets in the depth of the rollup table until it reaches an unoccupied node, then fills that node.

Upon completion of the loading sequence, another aspect of the invention involves a roll-out routine of the rollup function, which may be used to read parent candidates from the rollup table according to their parent confidences. The reading of parent candidates, known as "roll-out," begins with a terminal element known as an entry point. Each parent candidate is assembled in a sequence opposite the sequence in which the rollup table was loaded, as follows: After reading a terminal element from the last column, the roll-out routine then reads a next-to-last element from the node located at a next-to-last column immediately preceding the last column and at a row position less than the row position of the entry point by an amount equal to the child confidence associated with the terminal element. The next-to-last element is then prepended to the terminal element to form a string tail. A prefix element is read from a node located in the column immediately preceding the next-to-last column and at a row position less than the node of the next-to-last element by an amount equal to the confidence of the next-to-last element. The prefix element is then prepended to the string tail. If the sibling entities forming the rollup table have no serial relationship, then prepending involves combining the elements in reverse order of their loading in the rollup table. This reading process is repeated until the roll-out routine reaches the first column, completing roll-out of the parent candidate. If more than one element is located at a particular column and row location (i.e., elements are stored at more than one depth position), then the roll-out routine will continue reading parent candidates beginning from the same entry point until elements at all occupied nodes at all depths in the appropriate columns and rows have been read and all parent candidates having the same parent confidence have been rolled out, or until the desired number of parent candidates have been rolled out. The roll-out process is merely repeated for further parent candidates.

The method of loading the data table dictates that each row position corresponds to the parent rank of each parent candidate assembled from a terminal element located at that row position. The parent candidate (or candidates) with the greatest parent confidence may be read from the rollup matrix by beginning at a maximal node located at the last column and at the row of greatest row position. Consequently, parent candidates may be read in decreasing order of parent rank by merely assembling parent candidates in sequence, beginning with terminal element(s) located at the maximal node and continuing to read from the rollup table at entry points of decreasing row position until all parent candidates have been assembled. The process of building a rollup matrix and rolling-out parent candidates to form alt-sets can be repeated at each level in the data hierarchy. If desired, rollup functions can be nested by storing a nested "child" rollup function pointer at a node of a parent roll-up table.

Given the foregoing description of the invention, the use of software counters to facilitate the loading of the rollup matrix and the roll-out of parent candidates will be understood by those skilled in the art.

In another aspect of the invention, the rollup matrix is established in a computer memory using a plurality of memory pointers in place of the 3-dimensional data array of the rollup table. In this aspect of the invention, the terms "rows" and "columns" are arbitrary but are used herein to denote memory locations within the rollup matrix. In reality, each node of the rollup matrix includes a pointer to other nodes which contain a child possibility of an adjacent sibling entity. If a node must point to more than one child possibility, as in the case of multiple child possibilities at a particular column and row position, the node will include multiple pointers. When these multi-pointer nodes are encountered by the roll-out routine, a branch is indicated so that all pointers of each node are followed before moving to the next entry point.

Nodes occupying entry points shall be referred to as "entry nodes." Entry nodes further include a parent confidence which the roll-out routine recognizes as assigned to the parent candidate assembled beginning with the entry node. Entry nodes may also include a pointer to the next entry node in the matrix, which may have the same parent confidence or a lesser parent confidence. Nodes in the "first column," loaded with a child possibility of the first possibility set, may include a return pointer that may direct the roll-out routine to output the completed parent candidate for verification (e.g., using a dictionary) or to proceed to the next entry node for generation of the next parent candidate. Nodes at any location in the rollup matrix may also include a pointer to an entry node of a nested rollup matrix.

In yet another aspect of the invention, n-gram possibility sets are generated using an n-gram rollup function in accordance with the present invention. Comparison of parent candidate n-grams against an n-gram dictionary allows n-gram candidates to be weighted in accordance with their relative frequencies of occurrence in the context of, for example, the English language. Possibility sets including n-grams are readily accommodated in establishing the rollup matrix. For 3-grams, the nodes are loaded with the 3-grams at a row position which is the aggregate of the confidence of the central character (of the 3-gram) and the dictionary-provided frequency of the 3-gram. In this aspect of the invention, child possibilities in the first and last columns of the rollup matrix must be prepended and appended, respectively, with nulls (or spaces) so that all child possibilities are 3-grams. Further, the 3-gram child possibilities must be loaded in the rollup matrix so that when the parent candidates are rolled-out, all adjacent 3-grams assembled in a parent candidate share two characters. For example, "out" in the first column will fit with "uts" in the second column, but not with "nts."

In the context of OCR, the rollup function of the present invention is useful at every level of textual hierarchy. Rollup functions also avoid fatal problems often encountered by prior art string generators, which create strings from a series of possibility sets. Existing string generators suffer from three major problems. First, they are combinatorically expensive in memory use—needing a place in memory for each possible string. Second, string generators must trim strings before generating all possible strings because of limited space to store the combinatorically-many strings. Therefore, it is possible for string generators to result in higher-confidence strings being abandoned while lower-confidence strings are preserved. Third, string generators do not guarantee that strings of the same confidence, once ordered, retain that order.

The present invention gets around all these-problems in a natural way. First, the rollup function is only geometrically expensive of memory, not combinatorically. Tables generated by prior art systems grow as $L \times n^L$, where n is the number of possibilities per possibility set and L is the number of possibility sets (i.e., the string length). There are $n^L$ strings of length L that can be generated. By comparison, the rollup matrix of the present invention grows as $2 \times CF_{max} \times L^2$, where $CF_{max}$ is the highest confidence value in any possibility set. A significant savings over prior art systems. For L=10, n=3, and $CF_{max}$=20, and allowing 1 byte per ASCII character, approximately 590,490 bytes would be required for ranking tables of prior art systems; while only 12,000 bytes are required for the rollup matrix—a savings of 98%. Second, candidate strings can be read out of a rollup table in their decreasing order of confidence without having to store unneeded strings in memory, while never skipping a higher-confidence parent candidate for a lower confidence one. The rollup matrix does not change size with the number of generated strings. Therefore, all strings are preserved and there is no trimming of strings ever required. Third, no reordering of parent strings ever takes place because the rollup matrix is unchanging. Consequently, strings of the same confidence remain in their original order.

Parent candidates can be read from the rollup matrix in decreasing or increasing order of parent confidence. First, a parent candidate having a desired confidence value can easily be selected from the matrix by a confidence stored in association with an entry node of the parent candidate. Parent candidates having lesser (or greater) confidences can then be read until a desired lesser (or greater) confidence level is reached. This process can be repeated until a predetermined number of parent candidates have been obtained or until all possible parent candidates have been rolled-out. The rollup function can be interrupted while reading out a parent candidate to handle some other process, such as verifying the most recently rolled-out parent candidate using a dictionary. The rollup function easily returns to where it left off in the rollup matrix to read out the next-ranked parent candidate by returning to the location in the rollup matrix that was being accessed when the interruption occurred. The rollup function of the present invention provides the above-described benefits without requiring the production of all of the parent candidates before subsequent ranking. If a particular child possibility occurs with at most one confidence value in a possibility set, then the last rolled-out string is the pointer structure. Even in the case of allowed duplication, returning to the rollup function is as simple as storing a pointer to the next entry point in the rollup matrix and storing a pointer to each position of the table, which may be accomplished by freezing the internal pointer structure.

The rollup function of the present invention is, of course, not limited to strings. Any parent entity can receive rollup-produced alt-sets from its child entities. For example, gene sequence information prepared from a human, an animal, a plant, or any other living organism may be parsed into its nucleotides, each of which may be represented by an alt-set. Sibling nucleotide alt-sets can then be loaded into a rollup matrix for the parent gene. In this way, the frequency of naturally-occurring nucleotide and coding sequence variations can easily be represented by the child confidences associated with child possibilities of each alt-set. Inaccuracies inherent in the gene sequencing process can be similarly represented by the child confidences.

Additional aspects and advantages of this invention will be apparent from the following detailed description of preferred embodiments thereof, which proceeds with reference to the accompanying drawings.

BRIEF DESCRIPTION OF THE DRAWINGS

FIG. 3 is a flow diagram depicting an OCR process for scanning, parsing, and recognizing handwritten data to create possibility sets for use with a data verification routine of the present invention;

FIGS. 6A, 6B, 6C, and 6D are two-dimensional pictorial views of a rollup matrix in accordance with the present invention showing a loading sequence for loading the alt-sets of Table 3 into the rollup matrix;

FIG. 12 is a flow diagram showing steps for establishing and loading of the nested rollup matrices of FIG. 11; and FIG. 13 is a flow diagram showing parent candidates being rolled out from the nested rollup matrices of FIG. 11.

DETAILED DESCRIPTION OF PREFERRED EMBODIMENTS

Figure 1:
FIG. 1 is an enlarged view of a hand printed glyph.
Figure 2:
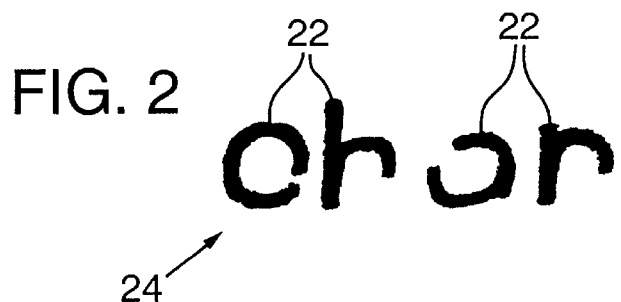
FIG. 2 is an enlarged view of a series of sibling glyphs.

FIG. 3 is a flow diagram of an OCR process 30 in accordance with a first preferred embodiment of the present invention. With reference to FIG. 3, a document 32 bearing physical textual data is scanned using an optical scanner 34, which produces a digital pixel image of the physical data on document 32. A segmentation process 36 of OCR process 30 receives the pixel image from the optical scanner and segments the pixel image into data segments for processing by a recognizer 38. Recognizer 38 analyzes the data segments to produce a possibility set ("pos-set") for each data segment. Empirical uncertainty in the physical data and inaccuracies of the scanning, segmentation and recognition process are represented in the pos-sets by including multiple child possibilities in each pos-set and by assigning child confidences to the child possibilities. For example, recognizer 38 separates a parent string (as in parent word 24 of FIG. 2) into its sibling glyphs and outputs a pos-set for each glyph. The pos-sets are output to a data verification routine 40, which uses a rollup function 60 (FIG. 4) and possibly one or more dictionaries 150 (FIG. 4) in accordance with the present invention.

Figure 5:
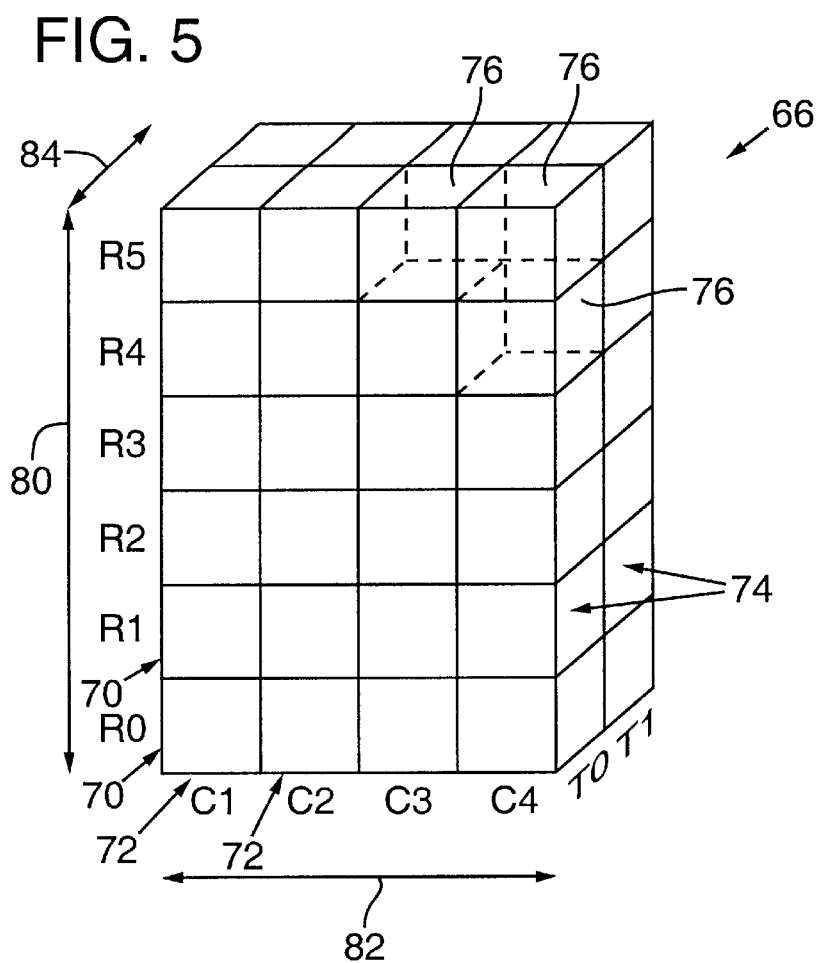
FIG. 5 is a pictorial view of a three-dimensional data array in accordance with a first preferred embodiment of the present invention.
Figure 4:
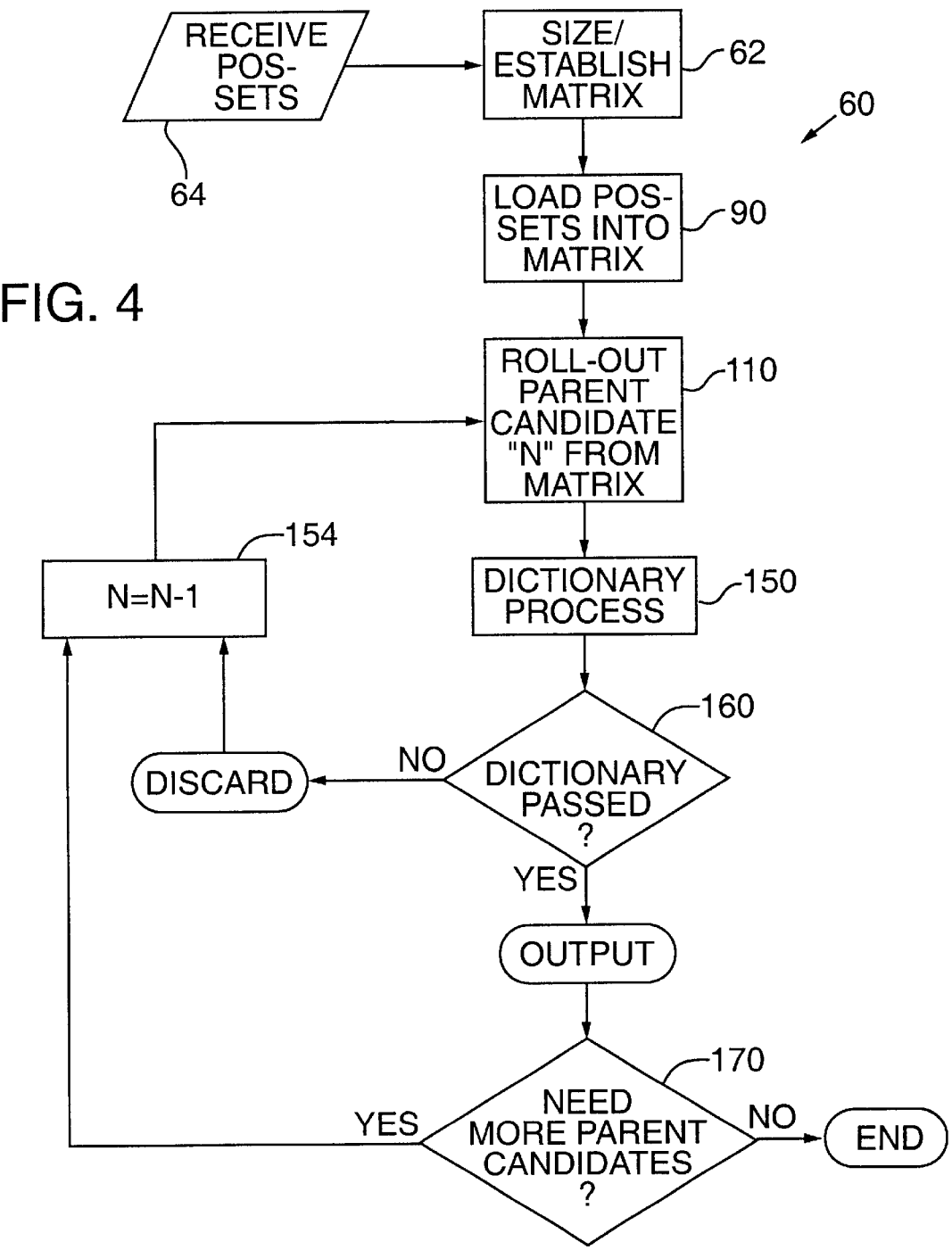
FIG. 4 is a flow diagram showing detail of the data verification routine of FIG. 3 including a rollup function and dictionary routine in accordance with a preferred embodiment of the present invention.

FIG. 4 is a flow diagram of rollup function 60 of data verification routine 40 (FIG. 3). With reference to FIG. 4, a matrix initialization routine 62 of rollup function 60, receives pos-sets 64 from recognizer 38. FIG. 5 is a pictorial view of a three-dimensional data array 66, which represents a data matrix in accordance with the present invention. Data array 66, includes rows 70, columns 72, and tiers 74 that together form nodes 76. With reference to FIGS. 4 and 5, matrix initialization routine establishes a size of data array

66 based on pos-sets 64. For purposes of a simple illustration, TABLE 3 presents four sibling pos-sets.

TABLE 3

| poss | conf | poss | conf | poss | conf | poss | conf |
|------|------|------|------|------|------|------|------|
| a    | 2    | n    | 1    | t    | 1    | s    | 1    |
| o    | 1    | u    | 0    |      |      | 5    | 0    |

A first pos-set shown in TABLE 3 includes two child possibilities, "a" and "o", which are assigned child confidences 2 and 1, respectively. A second pos-set includes child possibilities n and u, having associated child confidences 1 and 0, respectively. And so on. The matrix initialization routine calculates a sum of the maximum confidences of the four pos-sets (2+1+1+1=5) and adds one (5+1=6) to establish a height 80 of data array 66. Data array 66, thus, includes six rows 70, having row heights R0, R1, R2, R3, R4, and R5. A width 82 of data array 66 is equal to the number of pos-sets 64. A depth 84 of data array 66 is equal to the largest number of child possibilities in any of the pos-sets 64. In this example, three of the pos-sets are equally large, having two child possibilities.

Once data array 66 has been established and sized, a loading routine 90 of rollup function 60 loads pos-sets 64 into data array 66. FIGS. 6A, 6B, 6C, and 6D depict a loading sequence followed by loading routine 90. With reference to FIG. 6A, a data table 92 provides a two-dimensional representation of the three-dimensional data array 66 of FIG. 5, including four columns C1, C2, C3, and C4, each of which is divided by broken lines to indicate tiers 74 of data array 66 (FIG. 5). Loading routine 90 loads the child possibilities 94 of the first pos-set into the first column C1 so that each child possibility 94 is loaded in a node 96 at a row position equal to the child confidence 98 corresponding to child possibility 94. Thus, child possibility "o", which has an associated child confidence of one is loaded at the node located at row R1, and child possibility "a" is loaded at row R2 because it has an associated child confidence of two.

When loading routine 90 completes loading of the first pos-set (FIG. 6A), it proceeds to load the second pos-set into data table 92. With reference to FIG. 6B, each child possibility of the second pos-set is loaded in one node 96 of the second column (C2) for each row of the first column (C1) having filled nodes, but at a row height greater than the row height of the filled nodes 96 of column C1 by an amount equal to the child confidences being loaded. Thus, child possibility "u" having a child confidence of zero is loaded in nodes located at rows R1 and R2 of column C2, since rows R1 and R2 are filled in column C1. Child possibility "n" is loaded in nodes located at rows R2 and R3 of column C2, which are greater than the row positions of the filled nodes (R1 and R2) of column C1 by an amount equal to the child confidence (one) associated with child possibility "n". Because the node located at C2, R2, T0, is already filled with child possibility "u", loading routine 90 loads child possibility, "h" at node C2, R2, T1 so that no more than one child possibility is loaded in each node.

Loading routine 90 then continues to load successive pos-sets 64 in sequence in successive columns, as depicted in FIGS. 6C and 6D, until all pos-sets 64 have been loaded in data table 92. As in column C2, child possibilities 94 are loaded in nodes 96 located at row positions that are greater (by an amount equal to the child confidence of the child possibility being loaded) than the row position(s) of rows of the immediately preceding column that have filled nodes.

Nodes of the last column (C4) that are loaded with child possibilities contain data entities that are known as terminal elements 100.

Figure 7:
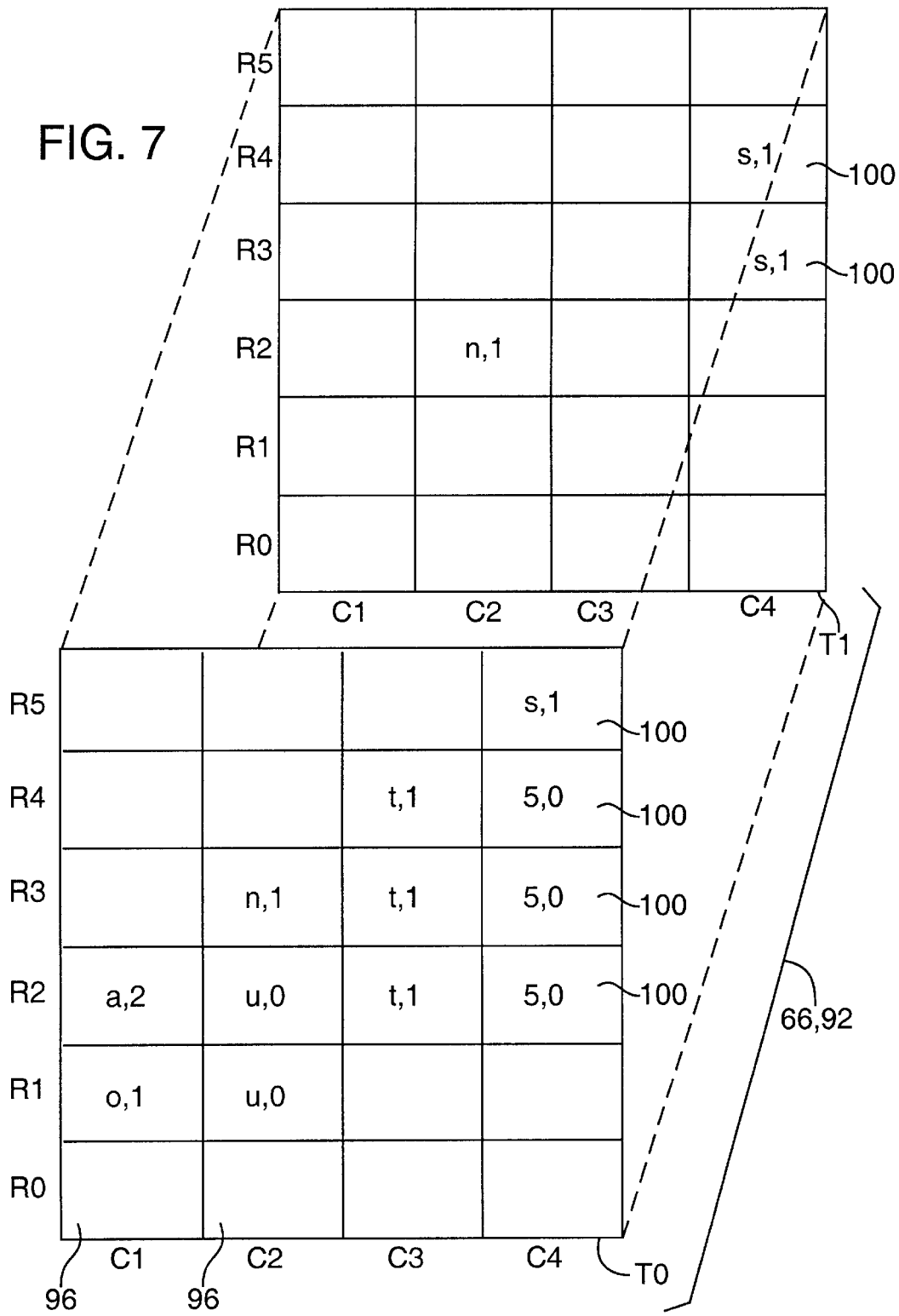
FIG. 7 is an exploded three-dimensional view of the loaded rollup matrix of FIG. 6D.

FIG. 7 is an exploded view of the loaded data table 92 of FIG. 6D showing its loaded data in a three-dimensional representation in accordance with three-dimensional data array 66 of FIG. 5.

Figure 8A:
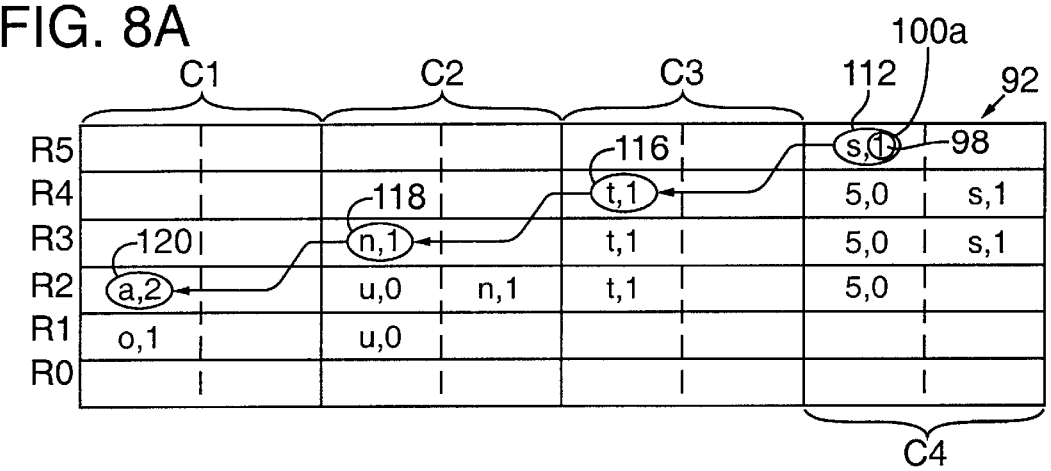
FIGS. 8A, 8B, 8C, and 8D show a sequence of rolling out a parent candidate from the loaded rollup matrix of FIG. 6D.

To extract parent candidate strings from data table 92, a roll-out routine 110 of rollup function 60 is provided (FIG. 4). FIG. 8A depicts the steps taken by roll-out routine 110, in rolling out parent candidate "ants", i.e., the parent candidate comprising the sibling characters "a", "n", "t", and "s". Parent candidate "ants" has the greatest aggregate confidence of any of the parent candidates because its terminal element ("s") 100 is located in the row of data table 92 having the greatest row position (R5), i.e., a maximal terminal element 112. With reference to FIG. 8A, roll-out routine 110 reads from columns C4, C3, C2, and C1, in the order opposite to which the columns were loaded. Terminal element "s" 100 (which is also the maximal terminal element 112) is read initially. Next, roll-out routine 110 reads next-to-last child element "t" 116 from the immediately previous column (C3) and from row R4, which has a row position less than the row position of terminal element "s" by the amount of the child confidence associated with terminal element "s" (i.e. one). Roll-out routine 110 prepends next-to-last child element "t" to the terminal element "s" to form a string tail of "ts." The child confidence of one associated with next-to-last child element "t" 116 then directs roll-out routine to read prefix element "n" 118 from row R3, column C2 (because row R3 has a row position one less than the row position of R4). Roll-out routine 110 prepends prefix element "n" 118 to the string tail "ts", to form the-partial string "nts." Element "a" 120, is then read because it is loaded in row R2, which is one less (the child confidence associated with prefix element "n" 118) than the row position of prefix element "n" 118. Element "a" 120 is prepended to complete the formation of candidate parent string "ants". The parent confidence associated with "ants" is equal to five, which is the row position of the terminal element 100a used to extract "ants".

Figure 8B:
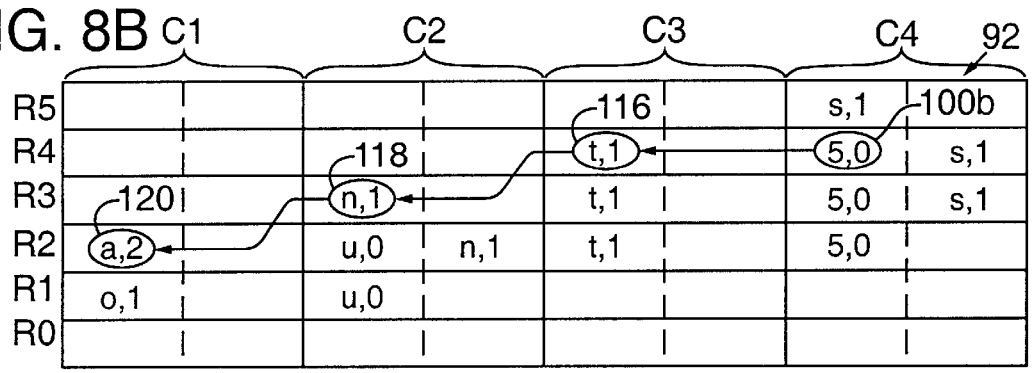

FIG. 8B depicts the steps taken by roll-out routine 110, in rolling out parent candidate "ant5". With reference to FIG. 8B, terminal element "5" has an associated child confidence of zero, which directs roll-out routine 110 to read next-to-last element "t" from the same row position (R4) in column C3. The parent confidence associated with "ant5" is equal to four, which is the row position of terminal element "5" 100b used to extract "ant5".

Figure 8C:
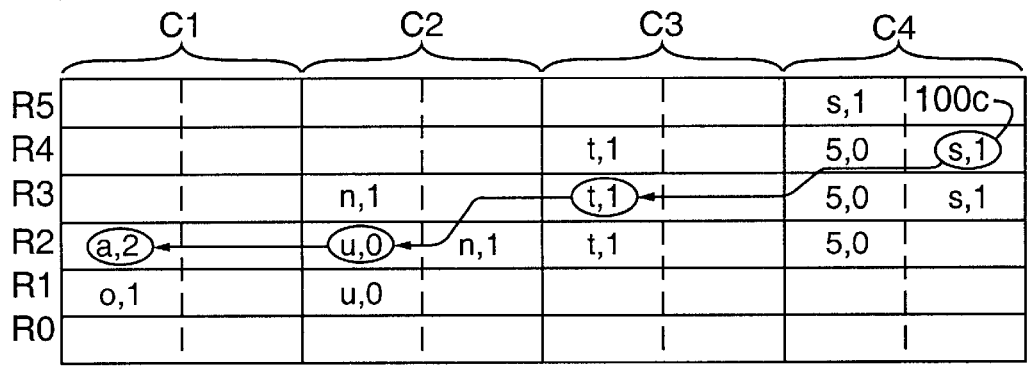
Figure 8D:
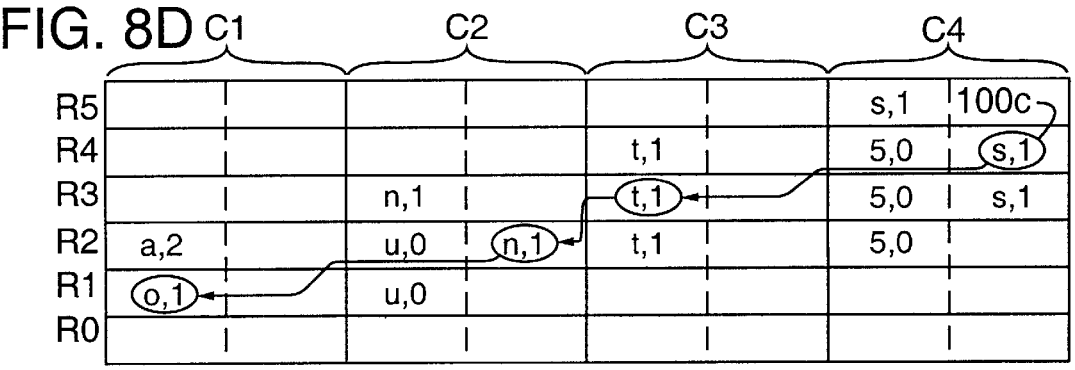

FIGS. 8C and 8D depict the steps taken by roll-out routine 110, in rolling out respective parent candidates "auts" and "onts." Because there are two entries in row R2, column C2, roll-out routine 110 rolls out two unique parent candidates ending with terminal element "s" 100c, both having an associated parent confidence of four, which is equal to the row height of row R4, where terminal element "s" 100c is located.

Figure 9:
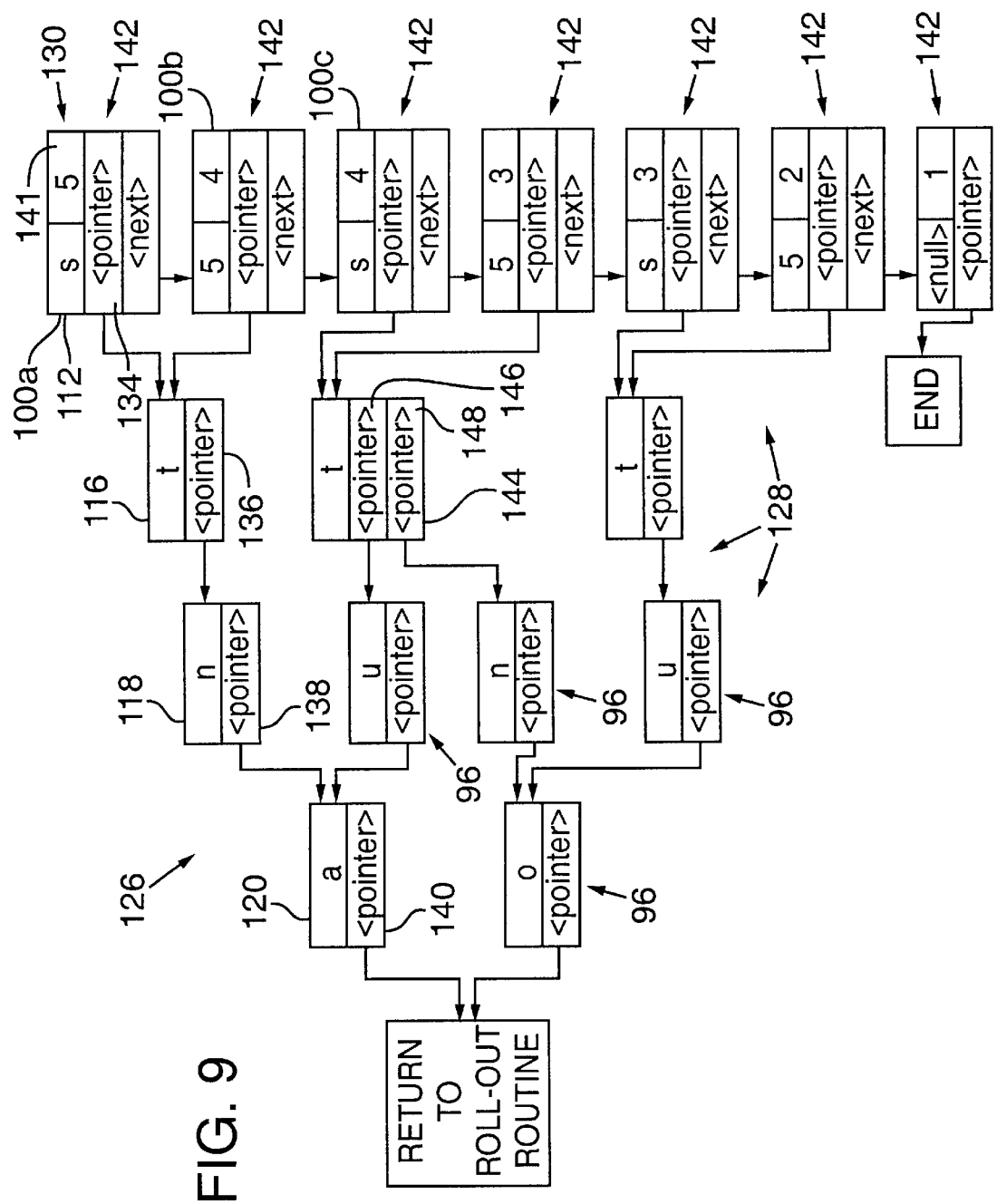
FIG. 9 is a diagram of an alternative embodiment of the rollup matrix of FIG. 6D including a linked list implemented in a computer memory.

In accordance with an alternative embodiment of the present invention, FIG. 9 shows the loaded data table 92 of FIGS. 6D and 7 embodied as a linked-list rollup matrix 126. With reference to FIG. 9, rollup matrix 126 includes a pointer structure 128 to nodes 96. To roll-out the parent candidate "ants", roll-out routine 110 starts at an initial entry point 130 that includes terminal element 100a (element "s" of maximal terminal element 112). Roll-out routine 110 then reads out elements "t" 116, "n" 118, and "a" 120 by following respective pointers 134, 136, and 138 and prepends them to element "s" 100a. A return pointer 140 indicates to roll-out routine 110 that it has completed construction of the parent candidate. A parent confidence 141 of the parent candidate "ants" is stored in association with the terminal element "s" 100a. All terminal elements of rollup matrix 126 serve as entry points 142 for rolling out one or more parent candidates. As in the roll-out sequences shown in FIGS. 8C and 8D, two parent candidates can be rolled out of rollup matrix 126 by beginning with terminal element "s" 100c. A branch node 144 of rollup matrix 126 includes two pointers 146, 148, which indicate to roll-out routine 110 that two different parent candidates use branch node 144 and that roll-out routine 110 needs to execute a branch at branch node 144. Those skilled in the art will understand that more than one branch node may clearly exist in rollup matrix, and that some branch nodes will have more than two pointers (if the matrix is "deeper" than two tiers).

After rolling out of each parent candidate (typically in decreasing order of parent confidence), rollup function 60 may output each parent candidate to a dictionary routine 150 (FIG. 4) for validation using an appropriate parser and dictionary. One embodiment of handling dictionary processing is shown in FIG. 4, and includes conditional iteration of roll-out routine 110. An iteration step 154 is conditional upon whether the parent candidate output by roll-out routine 110 passes the dictionary test (160) and, if it does, whether some other stop limit 170 has been met. For example, stop limit 170 may trigger OCR process 30 (FIG. 3) to terminate verification of the parent element represented by rollup matrix 126 (and rollup table 92), and to load the next series of pos-sets scanned and recognized from document 32.

Figure 10:
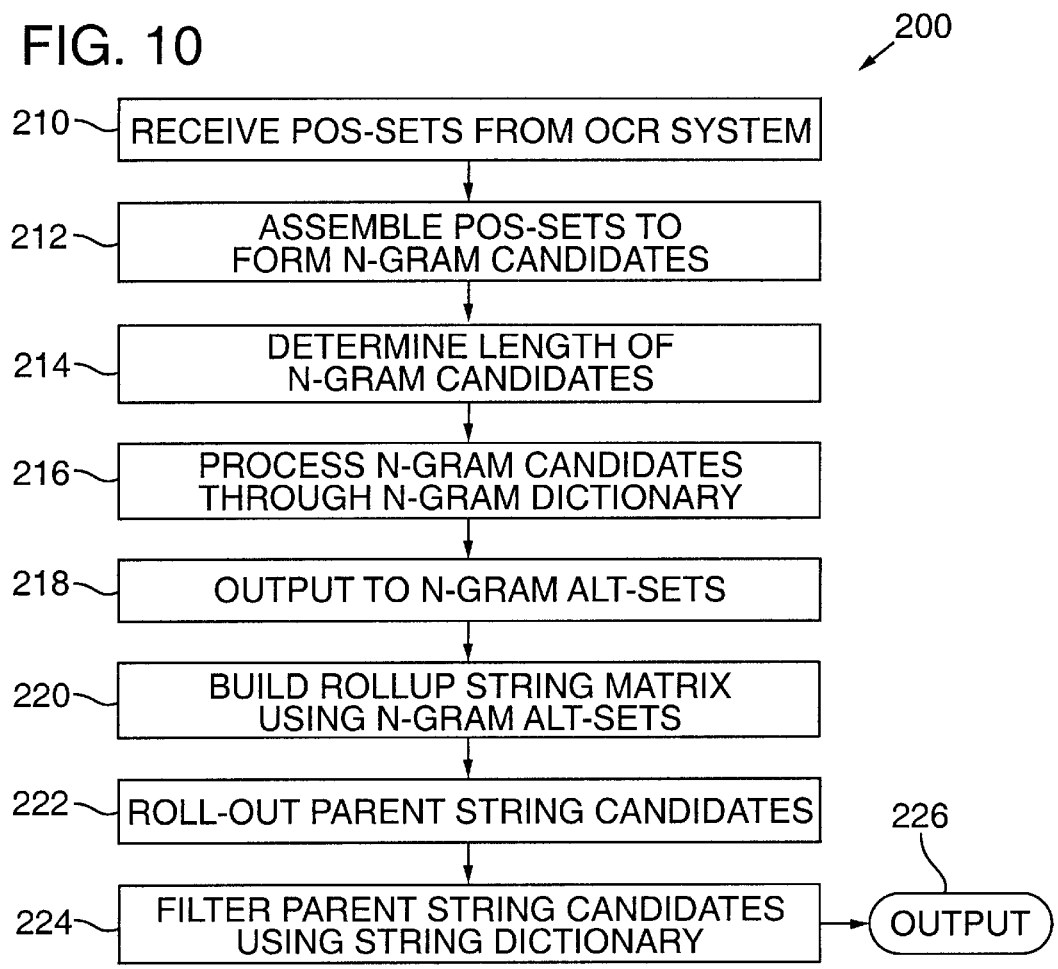
FIG. 10 is a flow diagram showing steps taken in preparation and validation of n-gram alt-sets for loading in a rollout matrix for a parent string of the n-grams.

FIG. 10 is a flow diagram showing steps taken in preparation and validation of n-gram alt-sets for loading in a rollout matrix for a parent string of the n-grams. With reference to FIG. 10, an n-gram verification process 200 receives pos-sets from OCR system (step 210) and assembles them in computer memory to form a ranked list of n-gram candidates (step 212). N-gram candidates within a single ranked list may have different lengths, for example when one of the pos-sets includes both an "m" possibility and an "rn" possibility. To accommodate n-gram candidates having different lengths, a length gage routine 214 of n-gram verification process 200 determines the length of each n-gram candidate. The n-gram candidates are then processed by an appropriate n-gram dictionary 216. N-gram dictionary 216 is a specialized dictionary or collection of specialized dictionaries that includes information about frequency of occurrence of n-grams (for example 2-grams, 3-grams, etc.) in written language or some subset of written language. N-gram dictionary 216 assigns an n-gram confidence to each n-gram candidate based on (i) the dictionary frequency rating for the n-gram and (ii) a child confidence associated with a central character of the n-gram candidate. N-gram and its associated n-gram confidence are then appended to an n-gram alt-set (step 218). Steps 214, 216, and 218 are then repeated until all of the lists of n-gram parent candidates have been processed through the dictionary and output as n-gram alt-sets. After all n-gram alt-sets have been completed, a string-sized rollup matrix is built using the alt-sets as sibling entities (step 220). Parent string candidates can then be rolled out of string-sized rollup matrix in ranked order (step 222) and processed using a string dictionary (step 224) before outputting ranked parent strings (step 226).

Figure 11:
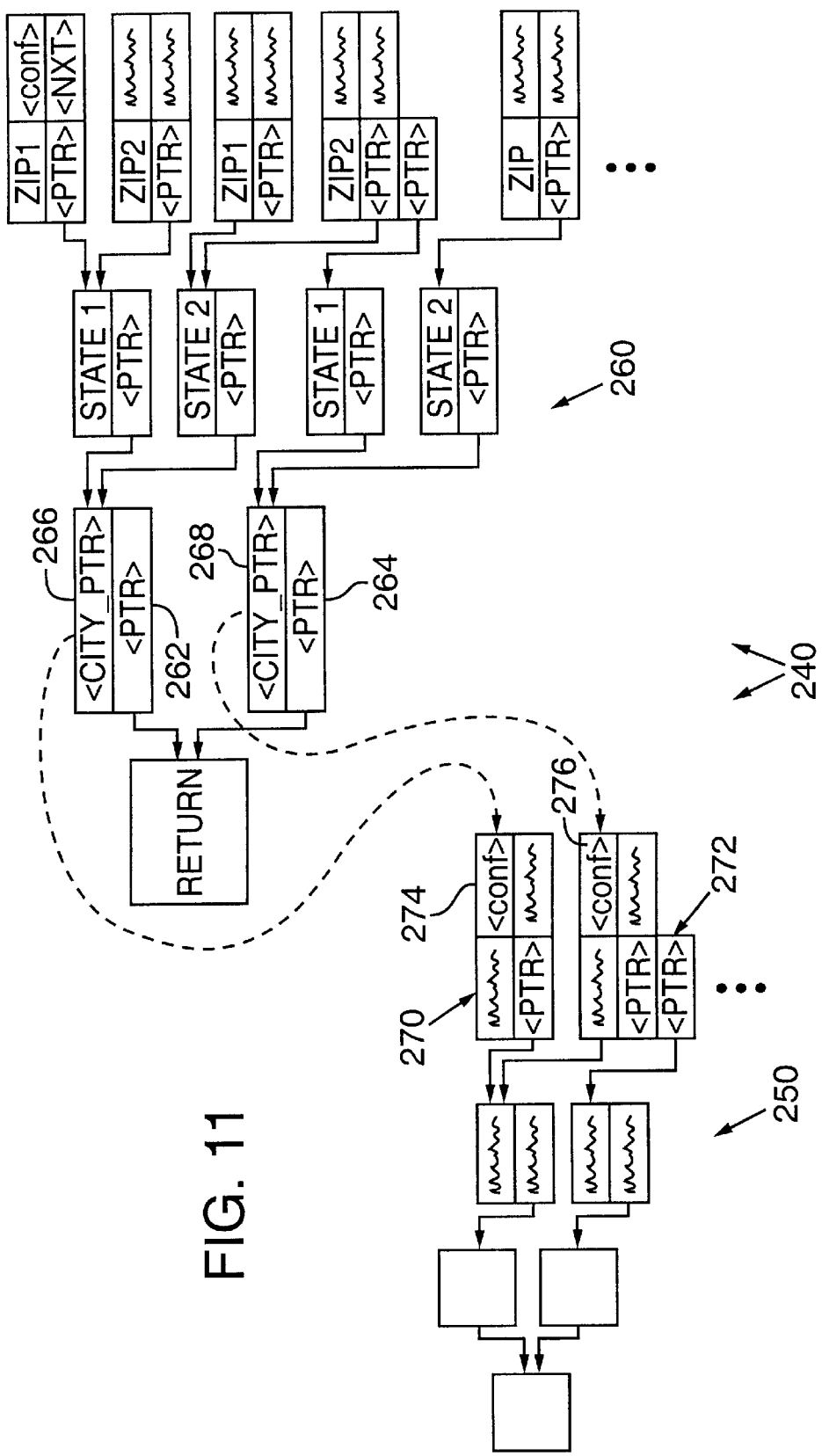
FIG. 11 is a two-dimensional pictorial view showing nested rollup matrices.

FIG. 11 is a two-dimensional pictorial view showing nested rollup matrices 240 established in accordance with the present invention. With reference to FIG. 11, nested rollup matrices 240 include a child rollup matrix 250 nested within a parent rollup matrix 260. Child rollup matrix 250 is said to be "nested" because complete candidates that may be rolled out of child rollup matrix 250 are referenced by pointers within parent rollup matrix 260. In this example, child rollup matrix 250 represents candidate city names in a typical rollup matrix in accordance with the present invention. However, any child entity can be represented in a nested child rollup matrix. Parent rollup matrix 260 is a typical rollup matrix in accordance with the present invention. In this example, parent rollup matrix 260 includes sibling city, state, and zip-code alt-sets. First and second city nodes 262, 264 of parent rollup matrix 260 include respective first and second city pointers 266, 268 to respective first and second entry points 270, 272 of child rollup matrix 250. First and second entry points 270, 272 are terminal nodes of child rollup matrix 250 having associated city confidences 274, 276. While the nested rollup matrices 240 of FIG. 11 include only one nested child matrix, it would be straightforward to nest multiple child matrices within a single parent rollup matrix. Likewise, it would be simple to create a hierarchy of nested rollup matrices including three or more layers of rollup matrices, rather than the two layers (child rollup matrix 250 and parent rollup matrix 260) of FIG. 11.

In setting up nested rollup matrices 240, child rollup matrix 250 is established before establishing parent rollup matrix 260. This order of establishing nested rollup matrices 240 ensure that city confidences 274, 276 of child rollup matrix 250 may be taken into account when establishing, sizing, and loading parent rollup matrix 260. When loading first and second city pointers 266, 268 in parent rollup matrix 260, city confidences 274, 276 of child rollup matrix 250 determine how parent rollup matrix 260 is loaded.

FIG. 12 is a flow diagram showing steps for establishing and loading of the nested rollup matrices of FIG. 11. With reference to FIG. 12, a child rollup matrix is first established and loaded (step 300). Once loaded, entry points for child candidates of the child rollup matrix, and their associated child confidences are available. These child candidates, entry points, and child confidences are then taken into account in establishing and sizing parent rollup matrix (step 310). Parent rollup matrix is then loaded (step 320). In the example of FIG. 11, parent rollup matrix 260 is loaded with a zip-code (postal code) alt-set in its terminal column and a state alt-set in its next-to-last column. Parent rollup matrix 260 also loaded with city pointers 266, 268 to appropriate entry points 270, 272 of child rollup matrix 250. After parent rollup matrix 260 has been loaded (step 320), ranked parent candidates may then be rolled out (step 330) for processing by a dictionary. The dictionary required for use with the nested rollup matrices 240 shown in the example of FIG. 11 is a city-state-zip dictionary for verifying specific city-state-zip combinations.

FIG. 13 is flow diagram showing a sequence of steps for rolling out a parent candidate from the nested rollup matrices 240 of FIG. 11. With reference to FIG. 13, a nested roll-out routine 400 starts at an entry point, which is a terminal parent node of a linked list of parent matrix (step 410). All subsequent steps shown in FIG. 13 are identical regardless of whether the current node is a terminal node or another node of nested rollup matrices 240. Nested roll-out routine 400 next determines whether the parent node includes a pointer to a nested child matrix (step 420). If not, then nested roll-out routine 400 reads the element stored in the current node (step 430) and prepends it to a parent candidate tail. Nested roll-out routine 400, then determines whether the node includes a return pointer that would indicate completion of the parent candidate (step 440). If not, then nested roll-out routine 400 advances to the next node in the linked list (step 450) and returns to step 420. If a parent node includes a nested matrix pointer to a nested rollup matrix (at step 410) then nested roll-out routine 400 proceeds to store in memory an address of the parent node that includes the nested matrix pointer (step 460). Nested roll-out routine 400 then rolls out a child candidate from the nested child matrix (step 470), and prepends the child candidate to the parent candidate tail (step 480). Nested roll-out routine then restores the address of the last-read parent node, which was previously stored in memory and returns to the parent rollup function (step 490), continuing on at the last read parent node.

When a parent node includes a return pointer (step 440), nested roll-out routine 400 completes its assembly of parent candidate and processes it using dictionary process 500. If the parent candidate passes the dictionary test, it is output. Nested roll-out routine 400 can be repeated for each terminal node of parent roll up matrix to complete roll out of all parent candidates.

It will be obvious to those having skill in the art that many changes may be made to the details of the above-described embodiments of this invention without departing from the underlying principles thereof. The scope of the present invention should, therefore, be determined only by the following claims.

What is claimed is:

1. A computer-implemented method of organizing a series of sibling entities for facilitating on-demand production of a ranked parent candidate of the series of sibling entities, each of the sibling entities comprising one or more child possibilities having an associated child confidence, the ranked parent candidate including one or more component elements, each component element consisting of one of the child possibilities selected from one of the sibling entities, the ranked parent candidate having a parent rank representing an aggregate of the child confidences associated with the child possibilities that comprise the component elements of the ranked parent, the method comprising:

(a) receiving a series of sibling entities including a first sibling entity and a last sibling entity;

(b) establishing a rollup matrix in a computer-readable data storage medium, the rollup matrix having a matrix height and a matrix width, the rollup matrix including multiple columns spanning the matrix width and multiple rows spanning the matrix height, each row having a row position along the matrix height; and (c) loading the rollup matrix with the series of sibling entities in a predetermined loading sequence starting with a first-loaded column of the rollup matrix and ending with a last-loaded column of the rollup matrix, the loading of the rollup matrix including:

i) storing the first sibling entity in the first-loaded column, including storing each child possibility of the first sibling entity in one of the rows, the row position of said row corresponding to the child confidence associated with the child possibility being stored, ii) in an unfilled column of the rollup matrix immediately following a previously-loaded column in the loading sequence, for each loaded row of the previously-loaded column in which a child possibility has been stored, storing in the unfilled column a next one of the sequential sibling entities including storing each of its child possibilities in the matrix rows having row positions equal to the sum of the row position of the loaded row of the previously-loaded column and the child confidence associated with said child possibility being stored, iii) repeating step (ii) until the last one of the sequential sibling entities has been stored in the last-loaded column of the rollup matrix, whereby the row position of each row of the last-loaded column containing one of the child possibilities corresponds to the parent rank of at least one ranked parent candidate that includes said one of the child possibilities.

2. The method of claim 1 in which each sibling entity has a child population representing the total number of child possibilities and in which the rollup matrix is established with a matrix depth equal to the largest of the child populations of the sibling entities.

3. The method of claim 1 in which:

receiving the series of sibling entities includes receiving a predetermined number of sequential sibling entities, each sequential sibling entity having a predetermined number of child possibilities, a maximum child confidence, and a position, one or more of said sibling entities having a largest number of child possibilities; and establishing the rollup matrix includes establishing a rollup matrix having a matrix height corresponding to the sum of the maximum child confidences of the received sibling entities, a matrix width corresponding to the predetermined number of sequential sibling entities, and a matrix depth corresponding to the largest number of child possibilities, the rollup matrix including multiple columns spanning the matrix width, multiple rows spanning the matrix height, and multiple tiers spanning the matrix depth.

4. The method of claim 1 in which:

at least one of the sibling entities includes a character possibility set, the character possibility set including character possibilities having associated character confidences; and the ranked parent candidates include candidate strings.

5. The method of claim 1 in which:

at least one of the sibling entities includes an alt-set, the alt-set including candidate n-grams having associated n-gram confidences.

6. The method of claim 5 in which the candidate n-grams are 2-grams.

7. The method of claim 5 in which the candidate n-grams are 3-grams.

8. A method in accordance with claim 1 in which:

establishing the rollup matrix includes establishing a nested child matrix of the rollup matrix; and at least one of the sibling entities includes a child possibility represented by a pointer to an entry point of the nested child matrix.

9. A computer-implemented method of organizing a series of sibling entities for facilitating on-demand production of a ranked parent candidate of the series of sibling entities, the ranked parent candidate including one or more component elements, each component element consisting of one of the child possibilities selected from one of the sibling entities, the ranked parent candidate having a parent rank representing an aggregate of the child confidences associated with the child possibilities that comprise the component elements of the ranked parent candidate, the method comprising:

(a) receiving a series of sibling entities $S_1, S_2, \ldots S_n$, each of the sibling entities comprising one or more child possibilities $CP_i$ having an associated child confidence $CF_i$, where i=1 ... m;

(b) establishing a rollup matrix in a computer-readable data storage medium, the rollup matrix having a matrix height and a matrix width, the rollup matrix including a series of columns $COL_1$, $COL_2$, ... $COL_n$ spanning the matrix width and a series of rows $R_1$, $R_2$, ... $R_p$ spanning the matrix height and located at respective row positions H=1, H=2, ... H=p along the matrix height; and (c) loading the rollup matrix with the series of sibling entities in a predetermined loading sequence starting with $COL_1$ and ending with $COL_n$, the loading of the rollup matrix, including the steps of:

i) storing $S_1$ in $COL_1$, including, for i=1, 2 ... m, storing each child possibility $CP_i$ of $S_1$ in one of the rows $R_H$, where $H=CF_i$,
  ii) initializing a variable j so that j=1,
  iii) incrementing j by 1,
  iv) for each loaded row $R_F$ of the previously-loaded column $COL_{j-1}$ in which a child possibility has been stored, in which the row position of $R_F$ is F, storing in $COL_j$ the corresponding sibling entity $S_j$ including storing each of its child possibilities $CP_k$ in matrix rows $R_{Hk}$ having row positions $H_k=F+CF_k$ for k=1, 2, ... q, where $CF_k$ is the child confidence associated with child possibility $CP_k$, and
  v) repeating steps (iii) and (iv) until the last one of the sequential sibling entities ($S_n$) has been stored in the last-loaded column ($COL_n$) of the rollup matrix, whereby the row position of each loaded row of the last-loaded column ($COL_n$) containing one of the child possibilities corresponds to the parent rank of at least one ranked parent candidate that using includes said one of the child possibilities.

10. The method of claim 9 in which each sibling entity has a child population representing the total number of child possibilities and in which the rollup matrix is established with a matrix depth equal to the largest of the child populations of the sibling entities.

11. The method of claim 9 in which:

receiving the series of sibling entities includes receiving a predetermined number of sequential sibling entities, each sequential sibling entity having a predetermined number of child possibilities, a maximum child confidence, and a position, one or more of said sibling entities having a largest number of child possibilities; and establishing the rollup matrix includes establishing a rollup matrix having a matrix height corresponding to the sum of the maximum child confidences of the received sibling entities, a matrix width corresponding to the predetermined number of sequential sibling entities, and a matrix depth corresponding to the largest number of child possibilities, the rollup matrix including multiple columns spanning the matrix width, multiple rows spanning the matrix height, and multiple tiers spanning the matrix depth.

12. The method of claim 9 in which:

at least one of the sibling entities includes a character possibility set, the character possibility set including character possibilities having associated character confidences; and the ranked parent candidates include candidate strings.

13. The method of claim 9 in which:

at least one of the sibling entities includes an alt-set, the alt-set including candidate n-grams having associated n-gram confidences.

14. The method of claim 13 in which the candidate n-grams are 2-grams.

15. The method of claim 13 in which the candidate n-grams are 3-grams.

16. A method in accordance with claim 9 in which:

establishing the rollup matrix includes establishing a nested child matrix of the rollup matrix; and at least one of the sibling entities includes a child possibility represented by a pointer to an entry point of the nested child matrix.

* * * * *

UNITED STATES PATENT AND TRADEMARK OFFICE
CERTIFICATE OF CORRECTION

PATENT NO. : 6,597,809 B1
DATED : July 22, 2003
INVENTOR(S) : David Justin Ross, Stephen E. M. Billester and Brent R. Smith It is certified that error appears in the above-identified patent and that said Letters Patent is hereby corrected as shown below:

Title page,
Item [54], "ROLLUP FUNCTIONS FOR EFFICIENT STORAGE PRESENTATION AND ANALYSIS OF DATA" should read -- ROLLUP FUNCTIONS FOR EFFICIENT STORAGE, PRESENTATION, AND ANALYSIS OF DATA -- (insert commas).

Column 1,
Line 45, ""(425) 867-0700"" should read -- "(425) 867-0700." -- (insert period).

Column 6,
Line 64, "these-problems" should read -- these problems --.

Column 9,
Line 19, "R4, and RS" should read -- R4, and R5 --;
Line 58, "possibility, "h" at node" should read -- possibility, "n" at node --.

Column 12,
Line 28, "ensure" should read -- ensures --;
Line 46, "matrix 260 also" should read -- matrix 260 is also --.

Column 13,
Line 20, "matrix to complete" should read -- matrix 260 to complete --.

Column 14,
Line 66, "$S_1, S_2,..._{sn}$," should read -- $S_1, S_2,...S_n$ --;

Column 15,
Line 34, "that using includes" should read -- that includes --.

Signed and Sealed this

Twenty-eighth Day of October, 2003

JAMES E. ROGAN
*Director of the United States Patent and Trademark Office*